Figure 7:
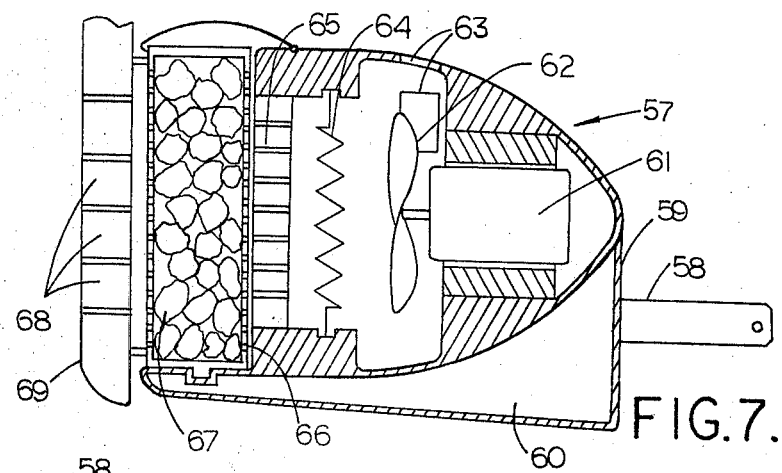

United States Patent [19]
Andeweg

[11] 3,948,445
[45] Apr. 6, 1976

[54] MATERIAL VAPOR GENERATOR WITH HEAT ACCELERATED VAPOR RELEASE

[76] Inventor: Frits J. Andeweg, 7737 Royal Lane, Dallas, Tex. 75230

[22] Filed: June 26, 1973

[21] Appl. No.: 373,682

[52] U.S. Cl. ................. 239/53; 239/57; 239/60; 239/136; 21/120
[51] Int. Cl. ................................................. A61l 9/02
[58] Field of Search .................. 239/34, 53–57, 239/60, 135, 136; 21/120

[56] References Cited
UNITED STATES PATENTS

| | | | |
|---|---|---|---|
| 1,864,980 | 6/1932 | Curran | 21/120 |
| 2,435,756 | 2/1948 | Schlesinger | 239/34 X |
| 2,469,656 | 5/1949 | Lienert | 239/136 X |
| 2,557,501 | 6/1951 | Fusay et al. | 239/136 X |
| 2,668,993 | 2/1954 | Bair | 21/120 |
| 3,080,624 | 3/1963 | Weber | 21/120 |
| 3,248,530 | 4/1966 | Titmas | 21/120 X |
| 3,423,022 | 1/1969 | Varley | 239/53 |
| 3,730,434 | 5/1973 | Engel | 239/55 X |
| 3,781,428 | 12/1973 | Hennart et al. | 239/60 X |

Primary Examiner—Robert S. Ward, Jr.

[57] ABSTRACT

A vapor generator with air freshening material and/or insecticide materials stored in porous material of the generator subject to heat accelerated vaporization release. Controlled vapor release of the stored material is attained through moderate heating and exposure of storage material in the generator.

7 Claims, 11 Drawing Figures

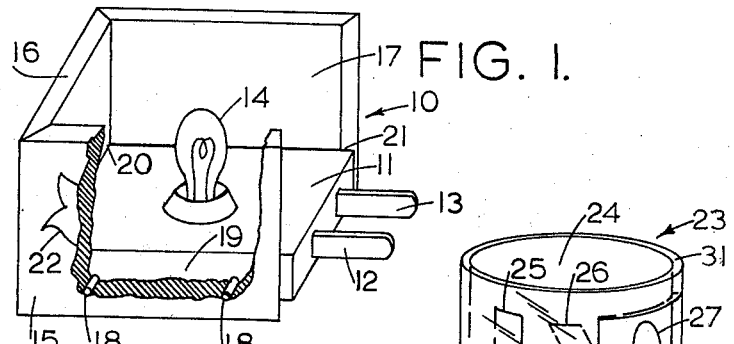
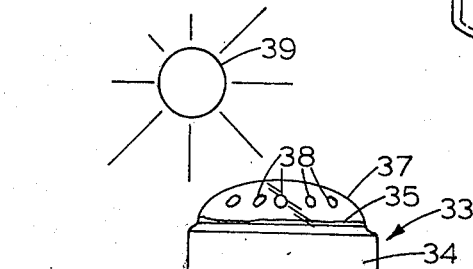
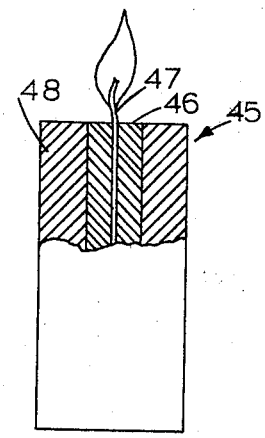
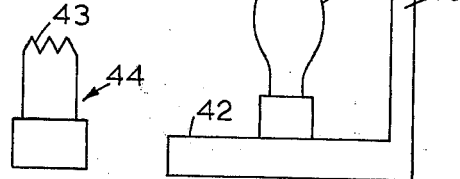
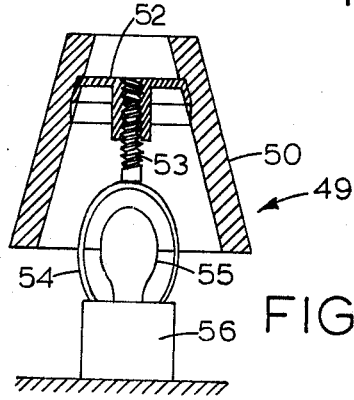

MATERIAL VAPOR GENERATOR WITH HEAT ACCELERATED VAPOR RELEASE

This invention relates in general to vaporization release of air freshening and insecticide materials, and in particular, to an air freshener material and/or insecticide material vapor generator with heat accelerated and controlled release of vapor material.

Insecticide and air freshness products have heretofor generally been stored in containers that are primarily for storing the chemical products involved. Activation of these preexisting insecticide generators and air freshener containers is primarily either opening a bottle by removing a cap or opening a can, spraying or unwrapping. Other than in the case of spraying, usually a manual operation, once insecticide generators (or air freshener units) are activated, the generation of chemical vapors is indiscriminate and continuous until the chemicals are dissipated to low concentration levels. Obviously, there is not very much control in these approaches and weather condition such as rain, snow and wind can have a significant effect on the evaporation of vaporizing products from such generators particularly outdoors and even indoors with drafts and air movement with heating and air conditioning.

It is therefore, a principal object of this invention to provide material vapor generators with release of vapor less subject to variation with environmental condition changes.

Another object is for material vapor generator to be so decoraive and/or inconspicuous that the prime function is hidden or camouflaged by decorative usage.

Still another object is to provide material vapor generators with heat energy accelerated and controlled release of vapor material.

A further object is to provide such material vapor generators with heat energy sources subject to variation control and/or remote control.

Features of the invention useful in accomplishing the above objects include, in material vapor generators with heat accelerated vapor release, material impregnated with a vaporizable scent, air freshener or insecticide material or any combination thereof subject to accelerated vaporization release with the application of heat. Each embodiment provides for the application of heat to the vapor material impregnated substance of the vapor generator. In some embodiments the vaporization material is impregnated in wax, plastic, cloth pads or other structural materials and positioned for heating by sunlight, light bulbs, heating elements, or flame. Light bulbs and heating elements are, obviously, subject to heat radiation control and/or remote control as may be desired. Further, some of the devices provide for vaporization release control by exposure adjustment and distance variation. Some material vapor generators assume the form of lamp shades with some having an electric plug in the assembly plugable in a wall plug to assume the form of a wall or night shade.

Specific embodiments representing what are presently regarded as the best modes of carrying out the invention are illustrated in the accompanying drawing.

IN THE DRAWING

Figure 7A:
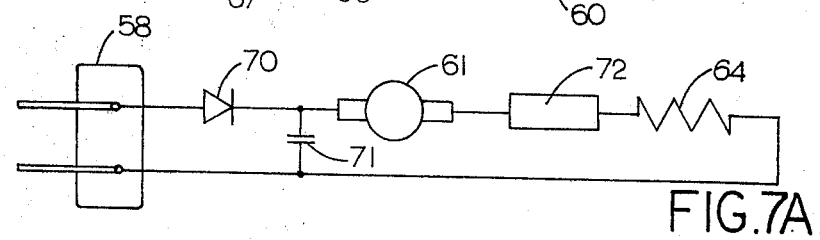
Figure 7B:
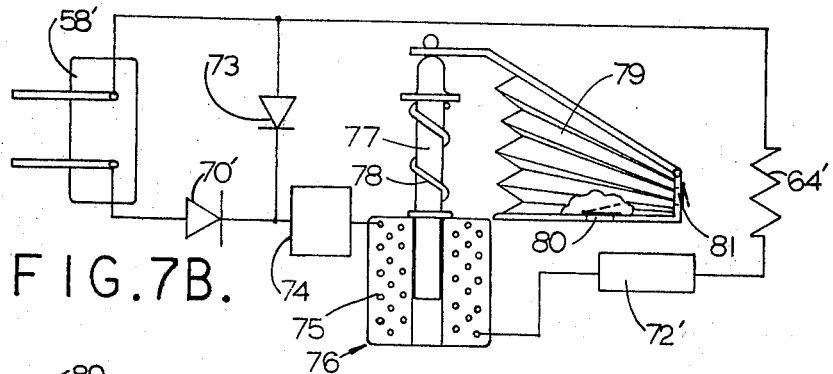
Figures 8, 9:
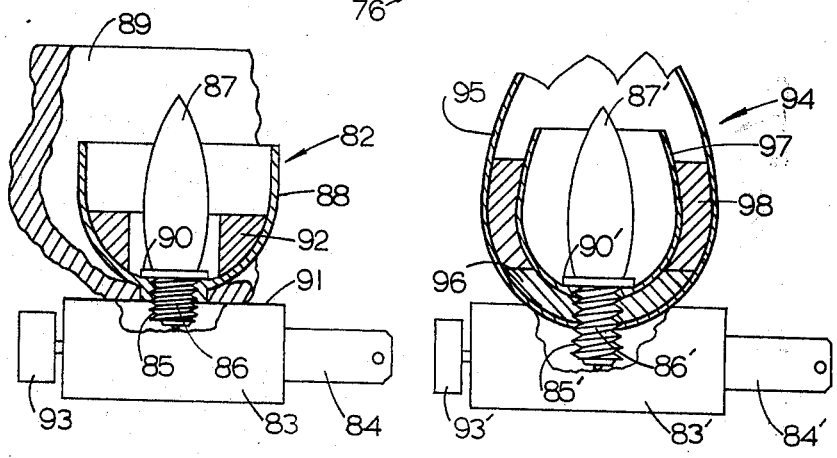

FIG. 1 represents a partially broken away and sectioned perspective view of a material vapor generator in the form of a wall plug insertable wall night lamp;

FIG. 2, a perspective view of a material vapor generator having a plurality of pockets of vapor material impregnated substances subject to selective exposure for desired vapor release;

FIG. 3, a side elevation view of a transparent material container having a perforated top and containing a scent, air freshener and/or insecticide substance impregnated material held in a holder for heating by the sun or a lamp bulb on the base of the holder;

FIG. 4, an electric heating element that may be substituted for the lamp bulb on the base of the holder of FIG. 3;

FIG. 5, a material vapor generator in the form of a burnable wax candle having vapor release with burning of the candle;

FIG. 6, a partially cut away and sectioned side elevation view of a material vapor generator in the form of a lamp with a shade impregnated with vaporizing material subject to vaporization release with heating, and with the shade adjustable for distance variation from its light bulb heat source;

FIG. 7, a partially cut away and sectioned side elevation view of a material vapor generator in the form of an electrical receptacle pluggable unit with a vaporizable material reservoir holder, a heater and a blower;

FIG. 7A, a control system for the material vapor generator of FIG. 7;

FIG. 7B, an alternate blower and control system for the material vapor generator of FIG. 7;

FIG. 8, a wall receptacle pluggable material generator lamp; and,

FIG. 9, a wall receptacle pluggable spaced double walled material vapor generator lamp.

Referring to the drawing:

The wall night lamp of FIG. 1 is a material vapor generator with an electric plug base 11 having electric plug male prongs 12 and 13 insertable into and supported by a wall plug electrical receptacle (not shown). Plug base 11 mounts an electric light bulb 14 that is a source of both light and heat for lamp side walls, 15, 16 and 17 that may be identical or vary to some degree from each other. The side walls 15, 16 and 17 are, however, attached to electric plug base 11 by attachment pins 18 that project from plug base edge sides 19, 20 and 21 for mounting the walls in place. Side walls 15, 16 and 17 are scent, air freshener and/or insecticide substance impregnated material walls subject to controlled release of vapor substance with heating from light bulb 14 that may be varied by current variation control and/or on-off switching control (detail not shown). In some instances side walls 15, 16 and 17, that could have illustration 22 thereon, are a vaporizing material impregnated wax, and in other instances a porous plastic material.

With the material vapor generator 23 of FIG. 2 a center cylindrical body 24 is provided with pockets 25, 26 and 27 of different shapes that hold scent, air freshener and/or insecticide substance impregnated pads 28, 29 and 30 of material. Pads 28, 29 and 30 are subject to selective exposure to the atmosphere by rotation of transparent material annular sleeve 31 about the cylindrical body 24 to bring sleeve opening 22 into registry with, or partial registry with one or more of the pads 28, 29 and 30. Sleeve 31 may be provided with additional openings to opening 32 as may be desired for additional control. Material vapor generator 23 may be positioned for vaporization release of material by sunlight, heat input from other energy sources and/or placement in or near a heat duct, or the body 24 could include a heating element (detail not shown).

The material vapor generator 33 of FIG. 3 includes a transparent plastic container 34 containing a scent, air freshener and/or insecticide substance impregnated material 35 such as a carrier wax or a porous substance. The container 34 includes a bottom body portion 36 and an upper lid cap 37 having a plurality of openings 38 for the egress of vapor released with heating of material 35. The vapor generator 33 may be positioned for vapor release with heating by sunlight from the sun 39 or other heat energy radiating source. The generator may be placed in holder 40 for heat activation from a light bulb 41 mounted on the base 42 of holder 40. The electric heat element 43 equipped unit 44 of FIG. 4 may be positioned on base 42 in place of light bulb 41 for heat activation and vaporization control of generator 33 by wattage input control of unit 44 (detail not shown).

The material vapor generator of FIG. 5 is in the form of a burnable wax candle 45 having an inner flammable wax portion 46 with wick 47 and an outer shell of material 48. Scent, air freshener and/or insecticide substance is impregnated in material of the candle to be vapor released with burning of the candle. In the embodiment of FIG. 5 the vapor material may be impregnated in either or both the wax portion 46 and the outer shell of material 48 and different vapor materials may be used as needed to meet requirements. Further, with some candles 45 the outer shell of material would also be wax, impregnated or not as the case may be, and with some candles 45 the outer shell of material 48 would be a porous nonburnable material that could also be impregnated with a vaporizable material.

The lamp 49 of FIG. 6 has a shade 50 of scent, air freshener and/or insecticide substance impregnated material supported by a height adjustable threaded 51 shade support nut 52 on threaded support bolt 53 mounted on a frame 54 around light bulb 55 extended from lamp base 56. The shade support nut 52 and shade 50 may be raised and lowered on support 53 to adjust the distance of the shade 50 from the light bulb and the rate of material vaporization from the shade by heat from the bulb 55.

The material vapor generator 57 of FIG. 7 is shown as a wall electrical receptacle insertable unit with an electrical plug 58 extended from a case 59 having a chamber 60 for electronic control circuitry (not shown). The vapor generator unit 57 includes a motor 61 driven blower propeller 62 drawing air in through case openings 63 and blowing it through heating element 64 to and through successively adjustable louver section 65 and vaporizable material reservoir perforated holder 66. The vaporizable material 67 within reservoir holder 66 is in the form of granules or pellets of material with air spaces and random passageways for the passsage of blown heated air therethrough and to the exterior through a vented 68 ornamental facing 69 mounted outside the resevoir holder 66.

Referring also to FIG. 7A control circuitry is shown that may be used with the material vapor generator of FIG. 7 much of which is contained within case chamber 60. The control circuitry is shown to include a series connected rectifying diode 70 and a capacitor 71 connected across the lines from plug 58 to convert AC to dc for a dc motor 61. A thermostat 72 is series connected in the circuit between motor 61 and heating element 64 to control the motor and heating element on and off in accord with temperature sensed wherever the thermostat 72 is placed in the vapor generator 57.

In the control and blower system of FIG. 7B diode 70' is series connected from one side of plub 58' and diode 73 is connected across the line to convert AC to dc. The junction of the cathodes of diodes 70' and 73 is connected to timing control circuit 74 connected at the control output side to the coil 75 of solenoid 76. This provides controlled input to periodically draw solenoid core rod 77 inward in the coil against the force of coil spring 78 that gives rod 77 return in cycled pumping of bellows 79. The bellows 79 has an inlet port 80 and an outlet port 81 for blowing air by heating element 64' in an alternate control system for the material vapor generator 57 of FIG. 7. Here again a thermostat 72', series connected in the circuit between solenoid coil 75 and heating element 64', provides on and off control in accord with temperature sensed wherever the thermostat 72' is placed in the vapor generator 57.

A wall receptacle pluggable material vapor generator lamp 82 is shown in FIG. 8. The lamp 82 has a base 83 with plug prongs 84 for plugging in a wall receptacle and an electric bulb socket 85 into which the threaded base 86 of electric bulb 87 is threaded. An open topped cupped container 88 of glass is held in place along with an ornamental glass (or plastic) facing piece 89 between the base flange 90 of bulb 87 and the top 91 of base 83. A reservoir material 92 such as scented wax is placed in the cupped container 88 in annular relation to the bulb 87. An on-off and current rate control switch 93 is provided on the front of base 83 for the lamp 82.

Another wall receptacle pluggable material vapor generator lamp 94 is shown in FIG. 9. This lamp 94 has a base 83' with plug prongs 84' and a bulb socket 85' into which the threaded base 86' of electric bulb 87' is threaded much the same as with the lamp of FIG. 8. An outer open topped cupped contaner 95 of glass, an annular spacer element 96 and an inner open topped cupped container 97 of glass are held in place between the base flange 90' of bulb 87' and the base 83'. A reservoir material 98 such as scented wax is placed between the outer container 95 and the inner container 97 above spacer element 96. An on-off and currant rate control switch 93' is provided on the front of base 83' for the lamp 94.

Whereas this invention is herein illustrated and described with respect to a plurality of embodiments thereof, it should be realized that various changes may be made without departing from the essential contributions to the art made by the teachings hereof.

I claim:

1. In a material vapor generator with heat accelerated and controlled vapor release: a reservoir material; vaporizable material impregnated in said reservoir material subject to activation by heat source means; positioning means holding said reservoir material for heat controlled vaporization release of said vaporizable material by heat from said heat source means; with said material vapor generator in the form of a lamp; and wherein said lamp is shaped for internal illumination with light source means supported by body means; and with said reservoir material in the form of side walling means supported by said body means in spaced relation from said light source means for air circulation in the space between said side walling means and said light source means.

2. The material vapor generator of claim 1, wherein said reservoir material is wax.

3. The material vapor generator of claim 1, wherein said lamp is shaped for internal illumination with a lamp bulb on an electrical plug body; and sections of reservoir material of said walling means in the form of side walls attached to said electrical body.

4. The material vapor generator of claim 3, wherein said side walls are vaporizable material impregnated wax subject to slow vaporizing release of the vaporizable material with moderate heating.

5. The material vapor generator of claim 3, wherein said side walls are vaporizable material impregnated porous plastic material walls.

6. The material vapor generator of claim 1, wherein said vaporizable material is one of a vaporizable scent, air freshener or insecticide material.

7. The material vapor generator of claim 1, wherein said vaporizable material is a plurality of vaporizable scent, air freshener or insecticide materials.

* * * * *